United States Patent
Ding et al.

(10) Patent No.: US 10,096,233 B2
(45) Date of Patent: Oct. 9, 2018

(54) ANONYMOUS DISARM DETECT WITH BUILT-IN CAMERA

(71) Applicant: Honeywell International Inc., Morristown, NJ (US)

(72) Inventors: Xianlong Ding, Shanghai (CN); Guopeng Ren, Shanghai (CN); Xinyu Ma, Shanghai (CN)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 483 days.

(21) Appl. No.: 14/605,439

(22) Filed: Jan. 26, 2015

(65) Prior Publication Data

US 2016/0217677 A1  Jul. 28, 2016

(51) Int. Cl.
| | |
|---|---|
| *G08B 25/08* | (2006.01) |
| *G08B 13/08* | (2006.01) |
| *G08B 25/00* | (2006.01) |
| *G08B 13/196* | (2006.01) |
| *G06K 9/00* | (2006.01) |
| *G08B 13/22* | (2006.01) |

(52) U.S. Cl.
CPC ....... *G08B 25/008* (2013.01); *G06K 9/00228* (2013.01); *G08B 13/1968* (2013.01); *G08B 13/22* (2013.01)

(58) Field of Classification Search
CPC  G08B 25/00; G08B 1/08; G06F 21/00; G06F 21/6245; H04N 7/18; H04N 11/04
See application file for complete search history.

(56) References Cited

U.S. PATENT DOCUMENTS

| | | | |
|---|---|---|---|
| 7,023,469 B1 * | 4/2006 | Olson | H04N 7/188 348/143 |
| 7,856,558 B2 | 12/2010 | Martin et al. | |
| 2005/0253706 A1 | 11/2005 | Spoltore et al. | |
| 2007/0182540 A1 | 8/2007 | Marman | |
| 2009/0200374 A1 | 8/2009 | Jentoft | |
| 2016/0148016 A1 * | 5/2016 | Rylski | G06F 21/6245 348/143 |

OTHER PUBLICATIONS

The extended European search report for corresponding EP patent application 16152328.7, dated Jul. 6, 2016.

* cited by examiner

*Primary Examiner* — Sathyanaraya V Perungavoor
*Assistant Examiner* — Patricia I Young
(74) *Attorney, Agent, or Firm* — Husch Blackwell LLP

(57) ABSTRACT

A system is provided that includes a control panel of a security system that protects a secure geographic area, a user input carried by the control panel that receives a disarm instruction disarming the security system, a camera carried by the control panel that captures an image of a person entering the disarm instruction, and a processor that disarms the security system in response to the disarm instruction received only when a human face of the person entering the disarm instruction is detected by the camera.

17 Claims, 3 Drawing Sheets

ANONYMOUS DISARM DETECT WITH BUILT-IN CAMERA

FIELD

This application relates to security systems, and more particularly, to interfaces of security systems.

BACKGROUND

Systems are known to protect people and assets within secured areas. Such systems are typically based upon the use of one of more sensors that detect threats within the secured area.

Threats to people and assets may originate from any of a number of different sources. For example, a fire may kill or injure occupants who have become trapped by a fire in a home. Similarly, carbon monoxide from a fire may kill people in their sleep.

Alternatively, an unauthorized intruder, such as a burglar, may present a threat to assets within an area. Intruders have also been known to injure or kill people living within the area.

In the case of intruders, the sensors may be placed in different areas based upon the respective uses of those areas. For example, if people are present during some portions of a normal day and not at other times, then the sensors may be placed along a periphery of a space to provide protection while the space is occupied while additional sensors may be placed within an interior of the space and used when the space is not occupied.

In most cases, the sensors are connected to a local control panel. In the event of a threat detected via one of the sensors, the control panel may sound a local audible alarm. The control panel may also send a signal to a central monitoring station.

While known security systems work well, they can be deactivated by someone who knows the proper deactivation codes at an entrance into the secured areas. Accordingly, a need exists for better ways of protecting against the improper use of security systems.

DETAILED DESCRIPTION

Figure 1:
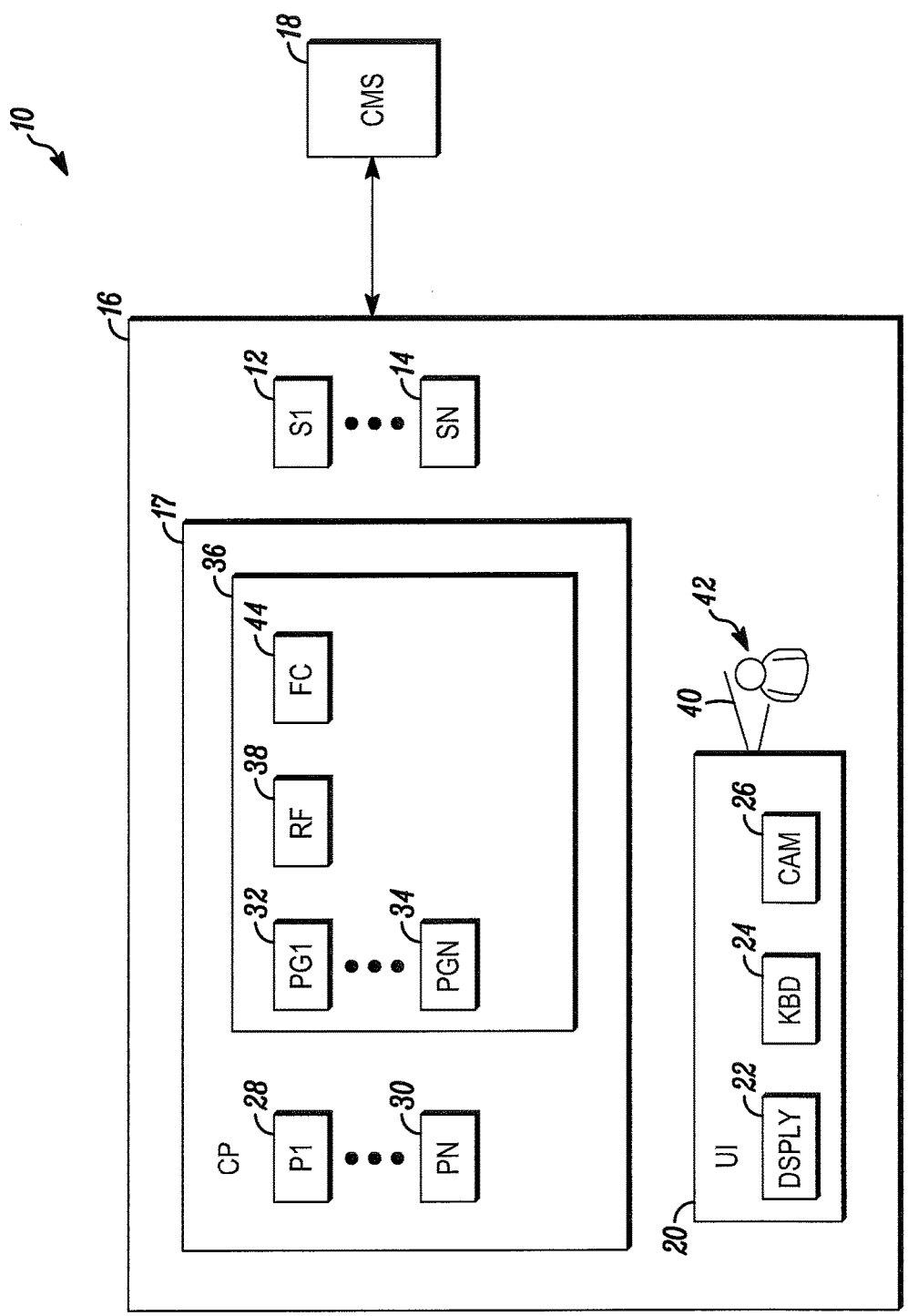
FIG. 1 illustrates a block diagram of a system in accordance herewith.

While disclosed embodiments can take many different forms, specific embodiments thereof are shown in the drawings and will be described herein in detail with the understanding that the present disclosure is to be considered as an exemplification of the principles thereof as well as the best mode of practicing the same and is not intended to limit the application or the claims to the specific embodiments illustrated.

FIG. 1 depicts a security system 10 shown generally in accordance with an illustrated embodiment. Included within the security system may be a number of sensors 12, 14 used for detecting threats within a secured geographic area 16. The threats may originate from any of a number of different sources. For example, an intruder may represent a threat to people and/or assets within a home or a business. Similarly, a fire or gas leak may threaten the safety of those same people and/or assets.

Accordingly, the sensors may be embodied in any of a number of different forms. For example, at least some of the sensors may be limit switches placed on doors and windows providing entry into and egress from the secured area. Some others of the sensors may be passive infrared (PIR) sensors placed within the secured area in order to detect intruders who have been able to circumvent the sensors along a periphery of the secured area. Still others of the sensors may be smoke or fire detectors.

Also included within the secured area is a control panel 17. The control panel may be located within the secured area as shown in FIG. 1 or located remotely.

The control panel may monitor the sensors for activation. Upon the activation of one of the sensors, the control panel may compose an alarm message and send it to a central monitoring station 18. The central monitoring station may respond by summoning the appropriate help (e.g., police, fire department, etc.).

The security system may be controlled by a human user through use of a user interface 20 located near an entrance into the secured area. The user interface may include a display 22 that shows a status of the security system (e.g., armed, disarmed, etc.) and a keyboard 24 for entering instructions.

Included within the control panel, the user interface, and each of the sensors may be one or more processor apparatuses (processors) 28, 30, each operating under control of one or more computer programs 32, 34 loaded from a non-transitory computer readable medium (memory) 36. As used herein, reference to a step performed by a computer program is also reference to the processor that executed that step.

In this regard, a status processor within the control panel may monitor the keyboard of the user interface for instructions from the human user. The human user may enter a personal identification number (PIN) and an instruction to arm or disarm the security system. Upon receiving the PIN and the instruction through the keyboard, the status processor may compare the PIN entered with PIN(s) of authorized users within a reference file 38. If the PIN entered matches the PIN of one of the authorized users, then the status processor may execute the instruction entered.

If the instruction is an arm command, then the status processor activates an alarm processor that monitors the sensors. Upon the activation of any of the sensors, the alarm processor composes and sends the alarm message to the central monitoring station.

Similarly, if the instruction is an arm-away command, then the alarm processor may only monitor the sensors along the periphery of the secured area. As above, upon the activation of one of the sensors along the periphery, the alarm processor composes and sends the alarm message to the central monitoring station.

Under one illustrated embodiment, the user interface also includes a television camera 26. A field of view (FOV) 40 of the camera extends outwards from the user interface to capture a human head and/or a human face of the human user 42 entering PINs and commands through the user interface.

Images from the camera are monitored by a face recognition processor. The face recognition processor may operate to detect a presence of the human face in the field of view of the camera at the same time that the PIN and the instruction are entered through the keyboard.

The field of view of the camera is adjusted such that an image processor coupled to the camera is able to capture an image of the human user entering the PIN and the instruction through the keyboard. The image captured is incorporated into a disarm notification that is sent to the central monitoring station. The disarm notification (and the image captured) are saved into a file as evidence of who entered the instruction along with a time and an identifier of the security system. This provides important forensic evidence if it were later found that the security system had been improperly used.

Under one illustrated embodiment, the face recognition processor is used to control operation of the security system through the user interface. For example, if the status processor should receive a valid PIN number and a command, execution of that command would be delayed until the human face is detected in front of the camera.

It should be noted, in this regard, that the user interface of FIG. 1 would normally be located within the secured area. In order for the human user to enter a disarm command, the human user would be required first to open a door (e.g., a front door) to access the user interface and then to enter the disarm command.

Upon opening the door, the human user would activate an intrusion sensor connected to the door. In response, a delay processor would delay activation of an intrusion alarm for a predetermined time period (timeout period) in order to allow any of the authorized users to enter the valid PIN and the disarm command. However, if the human user should enter his/her PIN and the disarm command while purposefully avoiding the camera, then the predetermined time period would expire before execution of the disarm command, an the alarm message would be sent to the central monitoring station, and a local alarm may be activated.

Stated in another way, the execution of the disarm command is logically ANDed with detection of the human face in front of the user interface. This adds another level of integrity to the proper use of the security system.

In general, it is not necessary for the face recognition processor to be able to determine the identity of the human user. The only thing necessary is that the face recognition processor be able to detect the presence of the human face (any human face) in the field of view of the camera.

Control of the disarm command by the face recognition processor may occur under any of a number of different methods. For example, the face recognition processor may continuously scan the field of view for human faces. Alternatively, the face recognition processor may only begin scanning upon activation of one or more of buttons on the user interface or may even delay scanning until the valid PIN number is detected. In any case, the only requirement is a concurrent presence of the valid PIN, the disarm command, and the human face in the field of view of the camera.

Figure 2:
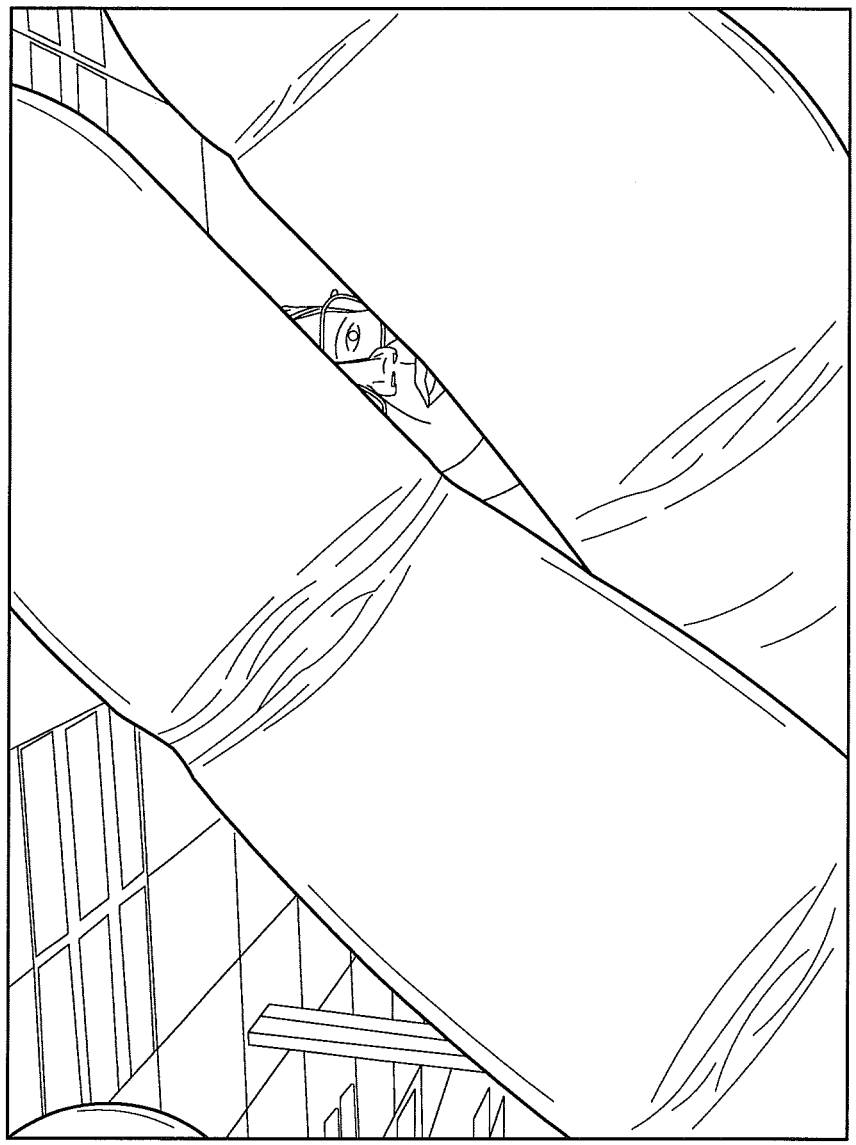
FIG. 2 depicts a screen that may be displayed by the system of FIG. 1.
Figure 3:
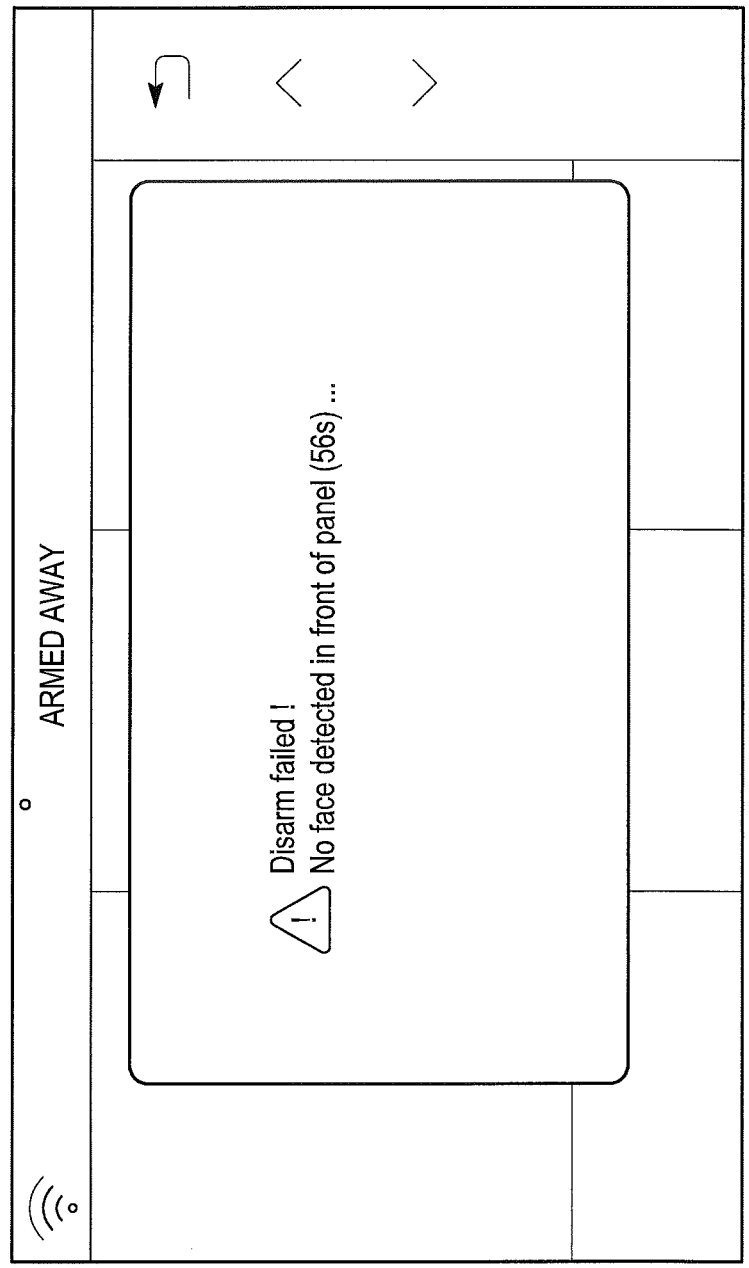
FIG. 3 depicts a warning screen that may be displayed by the system of FIG. 1.

Under one illustrated embodiment, a monitoring processor may monitor a delay required for face detection and present a warning to the human user on the display of the user interface. For example, FIG. 2 depicts the image from the camera in the case where the human user has placed his/her hand over the camera, thereby blocking any detection of the human face. In response, the monitoring processor may depict the image shown in FIG. 3 on the display of the user interface. In this case, so long as the human user holds his/her hand over the camera, the image of FIG. 3 continues to be displayed until the timeout period has expired and the intrusion alarm is activated. On the other hand, if the human user should remove his/her hand before the end of the timeout period, then the disarm command would be executed, and the security system would enter a disarm state. At that time, the image from the field of view of the camera is also sent to the central monitoring station.

The system of FIG. 1 offers significant advantages over current designs. For example, a system may have a camera built into a control panel. Every time the system is disarmed, the camera captures one picture (image) and sends it to a central monitoring station in order to record who disarmed the system.

In a current design of this type, the system can be disarmed while the camera is blocked by a hand of a user as shown in FIG. 2. As such, anyone who has a valid password can disarm the system without having their image captured by the camera and saved for future reference.

The system of FIG. 1 solves these problems. For example, when somebody tries to disarm the system, the control panel detects if anyone's face is in the camera's field of view via an image recognition algorithm executing on a corresponding processor. The system can be disarmed only when someone's face can be captured in an image from the camera. If a correct user code (PIN) is entered and the camera can't detect anybody's face, then the system will show one pop-up window and a voice warning until such time as a user's face can be detected within a limited time period.

After the correct user code and a disarm instruction are input by an authorized user, the control panel does a face scan before disarming the system. The disarm instruction succeeds only when any face can be detected within the limited time period. Otherwise, the system maintains an armed state and alarms upon activation of a sensor.

Under another illustrated embodiment, the requirement for detecting a human face during a disarm process is optional. The requirement is optional because the authorized user can enable or disable this feature.

Under one illustrated embodiment, the image recognition algorithm does not require a very high degree of face detection reliability. Stated in another way, the image recognition algorithm does not need to detect who is trying to disarm the system. The only thing necessary is that the image recognition algorithm be able to detect whether at least one human face is in the field of view of the camera when a disarm function is activated.

In general, a system includes a control panel of a security system that protects a secure geographic area, a user input carried by the control panel that receives a disarm instruction disarming the security system, a camera carried by the control panel that captures an image of a person entering the disarm instruction, and a processor that disarms the security system in response to the disarm instruction received only when a human face of the person entering the disarm instruction is detected by the camera.

Alternatively, a system includes a security system that protects a secure geographic area, a control panel of the security system located near an entrance into the secure geographic area, a user interface carried by the control panel that receives an instruction disarming the security system, a camera carried by the control panel that captures an image of a person entering the instruction, and a processor that disarms the security system upon receipt of the instruction through the user interface and upon detection of a human face within the image.

Alternatively, a system includes a security system that protects a secure geographic area, a control panel of the security system, a user interface of the control panel that receives an instruction disarming the security system, a camera carried by the control panel that captures an image of a person proximate the user interface, a face recognition processor that detects a human face within the image, and an alarm processor that disarms the security system upon receipt of the instruction and upon detection of the human face.

From the foregoing, it will be observed that numerous variations and modifications may be effected without departing from the spirit and scope hereof. It is to be understood that no limitation with respect to the specific apparatus illustrated herein is intended or should be inferred. It is, of course, intended to cover by the appended claims all such modifications as fall within the scope of the claims. Further, logic flows depicted in the figures do not require the particular order shown or sequential order to achieve desirable results. Other steps may be provided, steps may be eliminated from the described flows, and other components may be added to or removed from the described embodiments.

The invention claimed is:

1. A system comprising:
a control panel of a security system that protects a secure area;
a user interface of the control panel that receives a disarm instruction;
a camera coupled to the control panel that automatically activates in response to activation of one or more buttons of the user interface and, responsive thereto, continuously monitors an area extending outwards from the user interface; and
a processor of the control panel that determines whether a portion of the disarm instruction matches a preconfigured disarm code,
wherein, when the portion of the disarm instruction matches the preconfigured disarm code, the processor delays execution of the disarm instruction until the processor detects a presence of any generic human face within the area extending outwards from the user interface,
wherein, responsive to the processor detecting the presence of the generic human face within the area extending outwards from the user interface, the camera captures an image of the generic human face detected in the area extending outwards from the user interface, and
wherein the processor incorporates the image of the generic human face into a disarm notification and transmits the disarm notification to a central monitoring station.

2. The system as in claim 1 wherein the portion of the disarm instruction includes a personal identification number.

3. The system as in claim 1 wherein the processor measures a time period between receipt of the disarm instruction and detection of the presence of the generic human face.

4. The system as in claim 3 wherein the processor compares the time period with a threshold value and triggers an intrusion alarm upon detecting that the time period has exceeded the threshold value.

5. The system as in claim 4 wherein the processor sends the intrusion alarm to the central monitoring station.

6. The system as in claim 1 wherein the processor displays a warning on the control panel after detecting the disarm instruction and before detecting the presence of the generic human face.

7. The system as in claim 6 wherein the warning is displayed in a pop-up window shown on a display of the control panel.

8. The system as in claim 7 wherein the pop-up window displays a text message indicating that the disarm instruction has failed because the presence of the generic human face could not be detected.

9. A system comprising:
a security system that protects a secure geographic area;
a control panel of the security system located near an entrance into the secure geographic area;
a user interface of the control panel that receives a disarm instruction;
a camera carried by the control panel that automatically activates in response to activation of one or more buttons of the user interface and, responsive thereto, continuously monitors an area extending outwards from the user interface; and
a processor of the control panel that determines whether a portion of the disarm instruction matches a preconfigured disarm code,
wherein, when the portion of the disarm instruction matches the preconfigured disarm code, the processor delays execution of the disarm instruction until the processor detects a presence of any generic human face within the area extending outwards from the user interface,
wherein, responsive to the processor detecting the presence of the generic human face within the area extended outwards from the user interface, the camera captures an image of the generic human face detected in the area extending outwards from the user interface, and
wherein the processor incorporates the image of the generic human face into a disarm notification and transmits the disarm notification to a central monitoring station.

10. The system as in claim 9 wherein the portion of the disarm instruction includes a personal identification number.

11. The system as in claim 9 wherein the processor measures a time period between receipt of the disarm in instruction and detection of the presence of the generic human face.

12. The system as in claim 11 wherein the processor compares the time period with a threshold value and triggers a local intrusion alarm upon detecting that the time period has exceeded the threshold value.

13. The system as in claim 12 wherein the processor sends the intrusion alarm to the central monitoring station.

14. The system as in claim 9 wherein the processor displays a warning on the control panel after detecting the disarm instruction and before detecting the presence of the generic human face.

15. The system as in claim 14 wherein the warning is displayed in a pop-up window shown on a display of the control panel.

16. The system as in claim 15 wherein the pop-up window displays a text message indicating that the disarm instruction has failed because the presence of the generic human face could not be detected.

17. A system comprising:
a security system that protects a secure geographic area;
a control panel of the security system;
a user interface of the control panel that receives a disarm instruction;
a camera carried by the control panel that automatically activates in response to activation of one or more buttons of the user interface and, responsive thereto, continuously monitors a field of view proximate the user interface;

a face recognition processor that detects a presence of any generic human face within the field of view; and an alarm processor that determines whether a portion of the disarm instruction matches a preconfigured disarm code, wherein, when the portion of the disarm instruction matches the preconfigured disarm code, the alarm processor delays execution of the disarm instruction until the alarm processor receives a signal from the face recognition processor indicative of detection of the presence of the generic human face within the field of view, wherein, responsive to the face recognition processor detecting the presence of the generic human face within the field of view, the camera captures an image of the generic human face detected within the field of view, and wherein the alarm processor incorporates the image of the generic human face into a disarm notification and transmits the disarm notification to a central monitoring station.

\* \* \* \* \*